No. 607,542. Patented July 19, 1898.
J. O. INGLE.
COFFEE POT.
(Application filed Feb. 28, 1898.)
(No Model.)

Witnesses

Jacob O. Ingle,
Inventor

By his Attorneys,

THE NORRIS PETERS CO., PHOTO-LITHO., WASHINGTON, D.C.

UNITED STATES PATENT OFFICE.

JACOB ODEM INGLE, OF THORP SPRING, TEXAS.

COFFEE-POT.

SPECIFICATION forming part of Letters Patent No. 607,542, dated July 19, 1898.

Application filed February 28 1898. Serial No. 672,029. (No model.)

*To all whom it may concern:*

Be it known that I, JACOB ODEM INGLE, a citizen of the United States, residing at Thorp Spring, in the county of Hood and State of Texas, have invented a new and useful Coffee-Pot, of which the following is a specification.

The invention relates to improvements in coffee-pots.

The object of the present invention is to improve the construction of coffee-pots and to provide a simple and comparatively inexpensive one adapted to confine the grounds at the bottom and prevent them from escaping from it in pouring off the coffee.

Another object of the invention is to render the coffee-pot more efficient and increase the flavor of the cooked coffee.

The invention consists in the construction and novel combination and arrangement of parts, as hereinafter fully described, illustrated in the accompanying drawings, and pointed out in the claims hereto appended.

Figure 1:
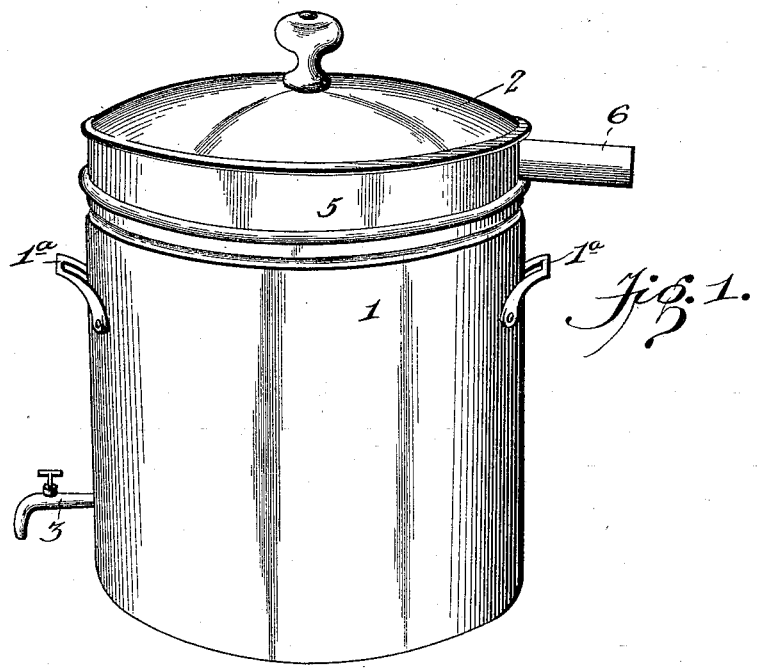
Figure 2:
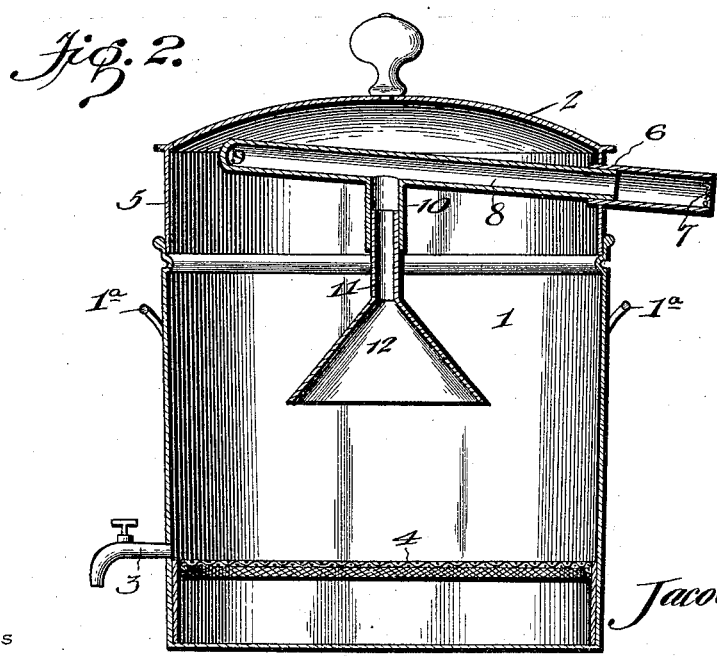

In the drawings, Figure 1 is a perspective view of a coffee-pot constructed in accordance with this invention. Fig. 2 is a vertical sectional view of the same.

Like numerals of reference designate corresponding parts in both figures of the drawings.

1 designates a coffee-pot having a lid 2 and provided with a faucet 3, connected with the coffee-pot, near the bottom thereof, and located above a wire strainer 4. The coffee-pot is provided at opposite sides with suitable handles 1ª, and the wire strainer 4, which is arranged directly upon the bottom of the coffee-pot, consists of cylindrical sides fitting snugly within the pot and supporting a disk of wire-gauze or other suitable foraminous material which will permit free access of water to the ground coffee and prevent the coffee-grounds from escaping while drawing off the liquid.

The lid 2 is provided with an extended flange 5, fitting within the upper edges of the body of the coffee-pot and supporting the top portion of the lid above the upper edges of the pot. The extended portion of the flange 5 is provided at one side with an opening in which is secured a short tube or spout 6, provided at the outer end with a strainer 7, of wire-gauze, and receiving at its inner end a substantially horizontal tube 8, having its inner end 9 closed.

The tube 8 is provided between its ends with a depending tubular portion 10, to which is coupled detachably a short tube 11 of a depending cone 12, which is supported by the horizontal tube 8. The horizontal tube 8 is detachably fitted in the inner end of the short spout 6, and the parts may be readily removed for cleaning and also when it is desired to pour the liquid through the spout 6. The cone 12 extends downward into the liquid, and steam rises within it when the coffee boils. The upper tubes, which lead from the cone, operate in the nature of a condenser, but permit the escape of any excess of steam. Any drip from the short spout 6 may be received within a suitable receptacle, and a coffee-pot constructed as herein shown and described is adapted to produce coffee of superior flavor. The coffee-pot may also be employed for general cooking when the cone and the supporting-tubes are detached.

The invention has the following advantages: The coffee-pot is exceedingly simple and inexpensive in construction. It is adapted to confine the grounds at its bottom and prevent them from escaping when the liquid is decanted, and the condensing device may be readily detached when it is necessary to clean the same or desirable to use the coffee-pot without it.

Changes in the form, proportion, and minor details of constuction may be resorted to without departing from the spirit or sacrificing any of the advantages of this invention.

What I claim is—

1. A device of the class described comprising a body or vessel, a lid, a short tube extending from the lid and forming a spout, a condensing-tube extending inward from the spout and closed at its inner end, and a depending cone provided with a tube and coupled with the condensing-tube at a point between the ends thereof, substantially as described.

2. A device of the class described comprising a body or vessel, a lid, a short tube extending outward from the lid and forming a spout, a condensing-tube extending inward from the spout, and a cone depending from the condensing-tube, substantially as described.

In testimony that I claim the foregoing as my own I have hereto affixed my signature in the presence of two witnesses.

JACOB ODEM INGLE.

Witnesses:
L. E. RHODES,
ELIZA I. MACY.